(12) United States Patent
Song et al.

(10) Patent No.: US 9,915,779 B2
(45) Date of Patent: Mar. 13, 2018

(54) KIND OF LOW MAGNETIC SENSITIVITY PM-PCF BASED ON MECHANICAL BUFFER

(71) Applicant: BEIHANG UNIVERSITY, Beijing (CN)

(72) Inventors: Jingming Song, Beijing (CN); Chunxi Zhang, Beijing (CN); Weile Li, Beijing (CN); Wei Cai, Beijing (CN); Jing Jin, Beijing (CN); Ningfang Song, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/630,155

(22) Filed: Jun. 22, 2017

(65) Prior Publication Data
US 2018/0003889 A1    Jan. 4, 2018

(30) Foreign Application Priority Data
Jul. 4, 2016   (CN) .......................... 2016 1 0518216

(51) Int. Cl.
*G02B 6/024*     (2006.01)
*G02B 6/02*      (2006.01)

(52) U.S. Cl.
CPC ......... *G02B 6/024* (2013.01); *G02B 6/02314* (2013.01)

(58) Field of Classification Search
CPC .......................... G02B 6/024; G02B 6/02314
See application file for complete search history.

(56) References Cited

U.S. PATENT DOCUMENTS

| | | | | |
|---|---|---|---|---|
| 5,841,131 A | * | 11/1998 | Schroeder | G01D 3/036 250/227.14 |
| 8,958,676 B2 | * | 2/2015 | Geernaert | G02B 6/02109 385/125 |
| 2005/0084223 A1 | * | 4/2005 | Tanaka | C03B 37/01217 385/125 |

* cited by examiner

*Primary Examiner* — Ryan Lepisto
(74) *Attorney, Agent, or Firm* — Pai Patent & Trademark Law Firm; Chao-Chang David Pai

(57) ABSTRACT

The low magnetic sensitivity PM-PCF based on mechanical buffer is obtained by adding buffer structures in the cladding layer of the photonic crystal fiber. In the center of the fiber, the core region contains at least 3 layers of air-holes, enclosed by the cladding layer. The buffer structures are placed in the cladding layer. These buffer structures are formed by replacing silica of any shape by air, and are symmetrically located in X-axis and Y-axis directions to achieve mechanical isotropy. The buffer structures improve the fiber's performance in fiber coiling and stress conditions. Therefore, the fiber optic gyroscope using the PM-PCF can do without a magnetic shield, thus greatly reducing the weight of the fiber optic gyroscope and extending the scope of its application. Compared with the conventional commercial PCF, the PM-PCF provides the fiber optic gyroscope with lower temperature sensitivity and improved accuracy.

6 Claims, 5 Drawing Sheets

KIND OF LOW MAGNETIC SENSITIVITY PM-PCF BASED ON MECHANICAL BUFFER

BACKGROUND OF THE INVENTION (a) Field of the Invention

This patent relates to satellite navigation, and more particularly to a new kind of mechanical buffer based polarization-maintaining photonic crystal fiber (PM-PCF) with low magnetic sensitivity for the fiber optic gyroscope (FOG) application.

(b) Description of the Related Art

Compared with conventional optical fibers, the photonic crystal fiber (PCF) contains many silica-air microstructures in its core region, which determine the fiber's optical characteristics. Therefore, by adjusting the geometric parameters of these microstructures, the PCF could be flexibly designed for the given purpose. FIG. 1 shows the PM1550-PCF 10a, which contains in the core region 11 (at least) three layers of air-holes 111 with diameter d and spacing Λ, while two air-holes 112 are enlarged to diameter D.

The arrangement of air-holes in the core region decides the fiber's optic parameters. During the fabrication process of the fiber optic gyroscope, the fiber could suffer from coiling, bending, twisting and temperature-induced stress, which will change silica's refractive index (elasto-optical effect), and affect the PCF's optical characteristics. FIG. 2 shows two kinds of forces on the fiber. Because of the low mechanical strength of silica, when the fiber is under external force, the refractive index of the silica will vary due to the elasto-optical effect. What's more, the arrangement of air-holes in the core region will be changed as well. Thus the fiber's optical characteristics are no longer reliable.

The factors above will influence the PCF's performance, increasing the fiber's magnetic sensitivity and magnetic errors. So far, the general solution to this problem is provided by adding a magnetic shield, which accounts for more than ⅓ of the weight in some small or medium gyroscopes, thus greatly restricting the application of the fiber optic gyroscope.

BRIEF SUMMARY OF THE INVENTION

Therefore, a new kind of PCF is needed, which has a more reliable crystal structure and refractive index (or birefringence) to maintain its optical characteristics and to achieve the low magnetic sensitivity of the fiber optic gyroscope. The present invention provides a kind of PM-PCF (polarization-maintaining photonic crystal fiber) with low magnetic sensitivity based on mechanical buffer.

The PCF according to the present invention is designed based on the existing three-layer PM1550-PCF 10a, by adding buffer structures in the cladding layer 12 of the PM1550-PCF 11. In the center of the fiber, the core region contains at least 3 layers of air-holes enclosed by the cladding layer. The mechanical buffer structures according to the present invention are placed in the cladding layer, and in most conditions are symmetrically positioned with respect to an X-axis and/or Y-axis (of a Cartesian coordinate system centered on the center of the core region) to achieve isotropy in mechanical properties (i.e. mechanical isotropy). In the present invention, the buffer structures are formed by replacing silica of any shape in the cladding layer by air.

In a preferred embodiment of the present invention, the PM-PCF has four annulus sector shaped buffer structures with the same width and radius, and symmetrically positioned in the X-axis and Y-axis directions.

The advantages and effects of the PM-PCF according to the present invention are:

(1) It has improved fiber performance in fiber coiling and stress conditions to a certain extent.

(2) Compared with the existing commercial PCF, the fiber optic gyroscope using the PM-PCF of the present invention does not need a magnetic shield, thus reducing the weight of the fiber optic gyroscope and extending the scope of its application.

(3) Compared with the existing commercial PCF, the PM-PCF of the present invention has lower temperature sensitivity, thus improving the stability of birefringence and accuracy.

DETAILED DESCRIPTION OF THE PREFERRED EMBODIMENTS

The present application will be described in detail below in conjunction with the accompanying drawings.

The present invention is achieved by adding mechanical buffer in the cladding layer of the existing photonic crystal fiber (PCF), for the mechanical buffer will be deformed in place of the core region under external force, thus protecting the core region of the PCF.

Figure 3:
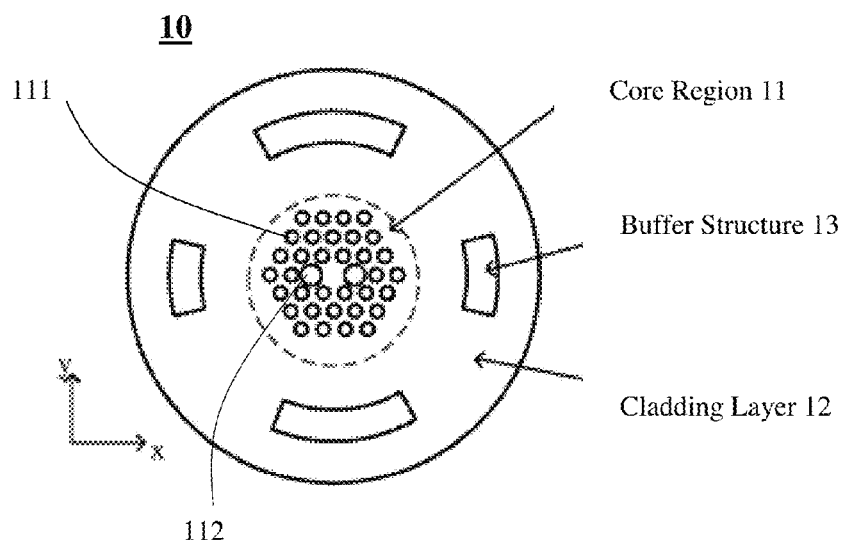
FIG. 3 shows an embodiment of the PM-PCF according to the present invention.

As shown in FIG. 3, the PCF 10 according to the present invention has a core region 11 containing at least 3 layers of air-holes 111 in the center of the fiber, and a cladding layer 12 enclosing the core region 11. The core region 11 decides the fiber's optical characteristics while the cladding layer 12 decides the mechanical characteristics. Therefore, to make an improvement in the fiber's mechanical instead of optical properties, the mechanical buffer should be located in the cladding layer 12. In the present invention, the mechanical buffer is in the form of buffer structures 13.

The buffer structures 13 are formed by replacing silica of any shape by air, which means that no solid materials are filled in the space within the buffer structures 13 during fabrication. The buffer structures 13 will be filled by air naturally when the fiber is finished. But the buffer structures 13 may also be filled with other gases for certain purposes.

In the following discussion, an imaginary Cartesian coordinate system is superimposed on the cross section of the fiber, with its origin located at the center 110 of the core region 11 and the X-axis and the Y-axis corresponding to the horizontal and vertical directions, respectively.

Figure 1:
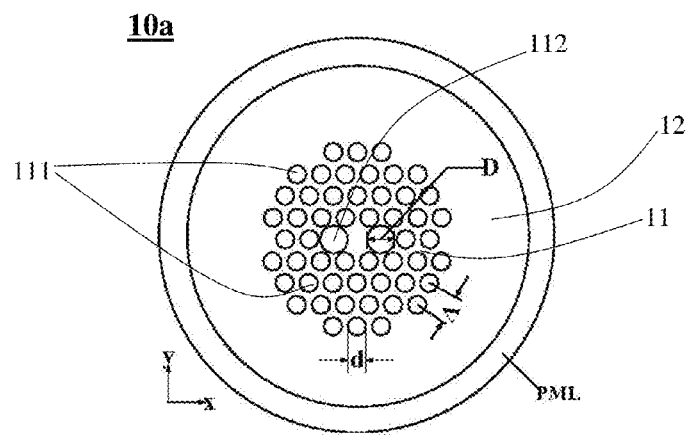
FIG. 1 shows the PM1550-PCF's air-hole microstructures.
Figure 2:
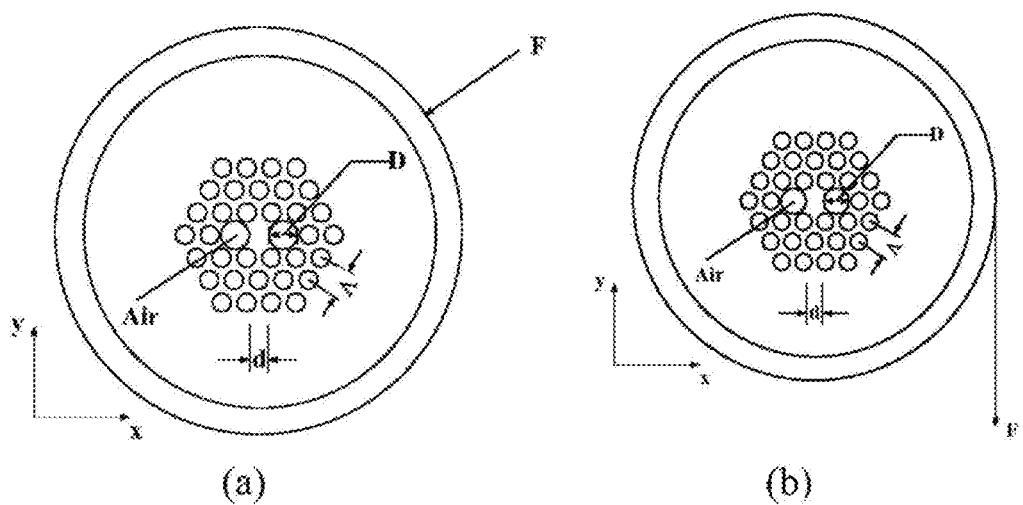
FIG. 2 shows the PM1550-PCF under external force F, with different forces applied in (a) and (b)

In most conditions, the buffer structures 13 are positioned symmetrically with respect to the X-axis and/or the Y-axis, and are distributed in slightly different ways in those two directions. Because the external force is totally arbitrary, the buffer structures 13 should be symmetrically positioned to protect the fiber in any case. Besides, in order for the fiber to have birefringence, the two air-holes 112 along the X-axis near the center are enlarged as shown in FIG. 1. Therefore, this will be compensated for by adopting smaller buffer structures in the X-axis direction. In other words, the buffer structures 13 are aimed at realizing mechanical isotropy.

Figure 4:
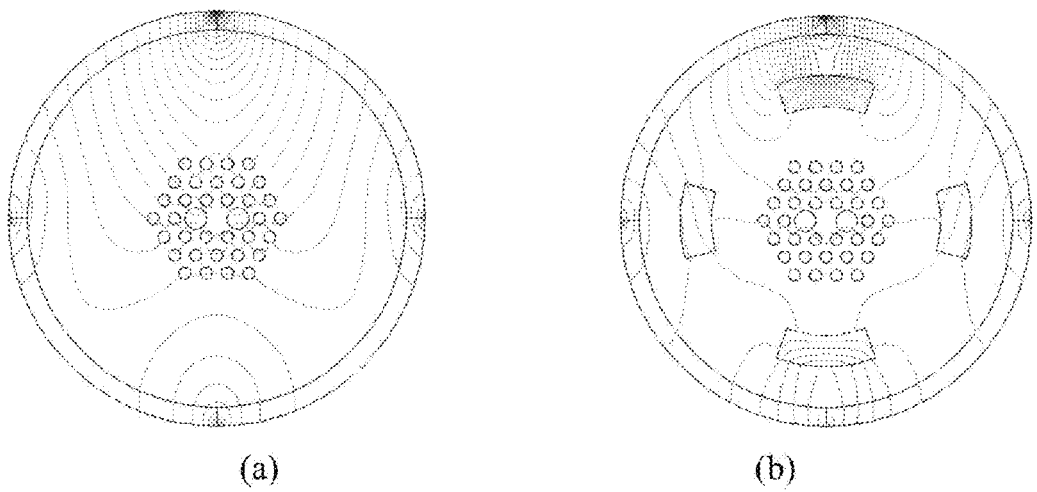
FIG. 4 shows the deformation contour under certain force respectively for (a) the conventional PCF and for (b) the PCF shown in FIG. 3 according to the present invention.

Simulation results indicate that the direction in which the hexagonal crystal core is most fragile is the Y-axis direction. In other words, the birefringence varies most when the external force comes from the Y-axis direction. Then comes the X-axis direction and the direction perpendicular to the sides of the crystal core (i.e. the 30° and 60° directions), and the strongest direction is the 45° direction, for the birefringence variation in X-axis and Y-axis directions tend to be compensated. The new PCF design shown in FIG. 3 has four annulus sector shaped air buffer structures 13, which absorb the external force and are deformed in place of the core region 11. FIG. 4 shows that the fiber in FIG. 3 have little deformation in its core region 11 due to its buffer structures 13. Besides, simulations have shown that the four buffer structures 13 designed with the parameters according to the present invention will not negatively impact the heat conduction in the fiber section.

Figure 5:
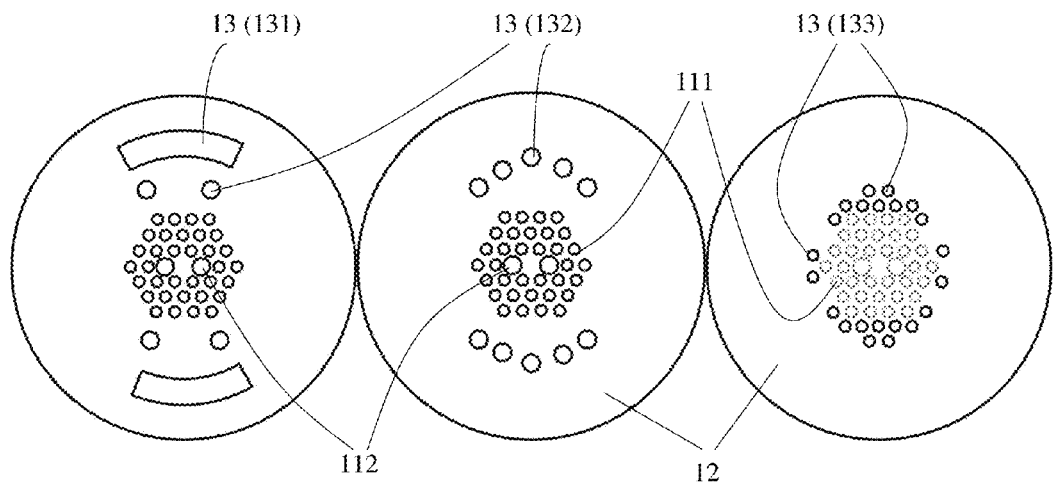
FIG. 5 shows three different designs of the mechanical buffers for the PCF according to the present invention.

The buffer structures 13 of the present invention can be in various forms according to actual situations, and the parameters are chosen by simulation results. FIG. 5 shows three different designs of buffer structures 13. The first design includes both air-holes 132 and annulus sector shaped buffer structures 131 in the Y-axis direction. The second design replaces the annulus sector shaped buffer structures 131 by air-holes 132. The last design forms the buffer by expanding the core region 11 with the air-holes 133 immediately outside the core region 11, since the air-holes 133 outside the 3-layer crystal core have no impact on the electromagnetic wave in the center core region 11.

Figure 6:
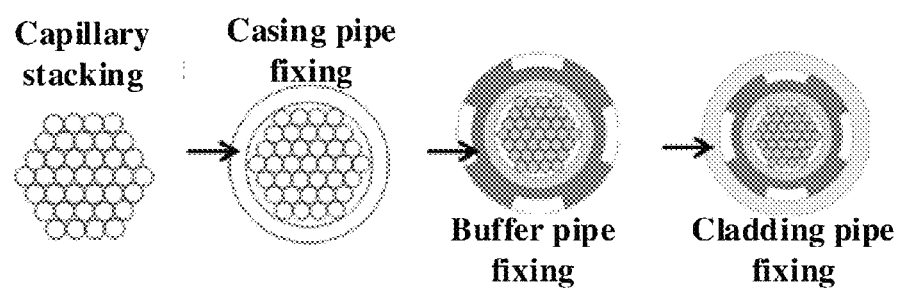
FIG. 6 shows the 'stack and draw' fabrication process of the PCF of the present invention shown in FIG. 3.

The buffer structures 13 can be made by any possible process. One process of fabrication of buffer structures 13 in FIG. 3 called 'stack and draw' is shown in FIG. 6. In this process, four steps are taken to add buffer structures in the cladding layer 12: capillary stacking, casing pipe fixing, buffer pipe fixing and cladding pipe fixing.

As mentioned, each of the buffer structures 13 of the new PCF in FIG. 3 has a shape of an annulus sector. Generally speaking, an annulus sector is an area bordered by two concentric circles and two straight lines from the center of the two circles. In the following, the inner circle of each annulus sector has a radius r, the difference between the radii of the two concentric circles is d'; the angle between the two straight lines bordering the annulus sector is denoted as θ; the angle is denoted as $θ_x$ if the angle is split into two by the X-axis, or $θ_y$ if the angle is split into two by the Y-axis.

For fabrication consideration, the parameters of the buffer structures 13 are always in discrete values to simplify the fabrication, and the width d' and radius r are equal in X-axis and Y-axis for the same reason. The mechanical isotropy is achieved by taking different central angle $θ_x$ and $θ_y$.

Figure 7:
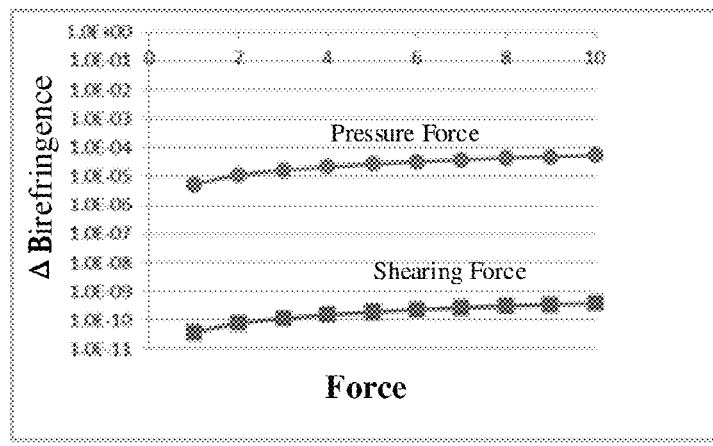
FIG. 7 shows the difference in the order of magnitude of the impact between pressure force and shearing force.

Former studies have shown that after the coiling procedure, when the fiber's temperature is in the range from −40° to 70°, where the temperature-induced force is about 0-2 N, the birefringence change caused by pressure is about $10^4$ times larger than that caused by shearing force, as shown in FIG. 7. Therefore, the simulation is focused on the effect of pressure.

Figure 8:
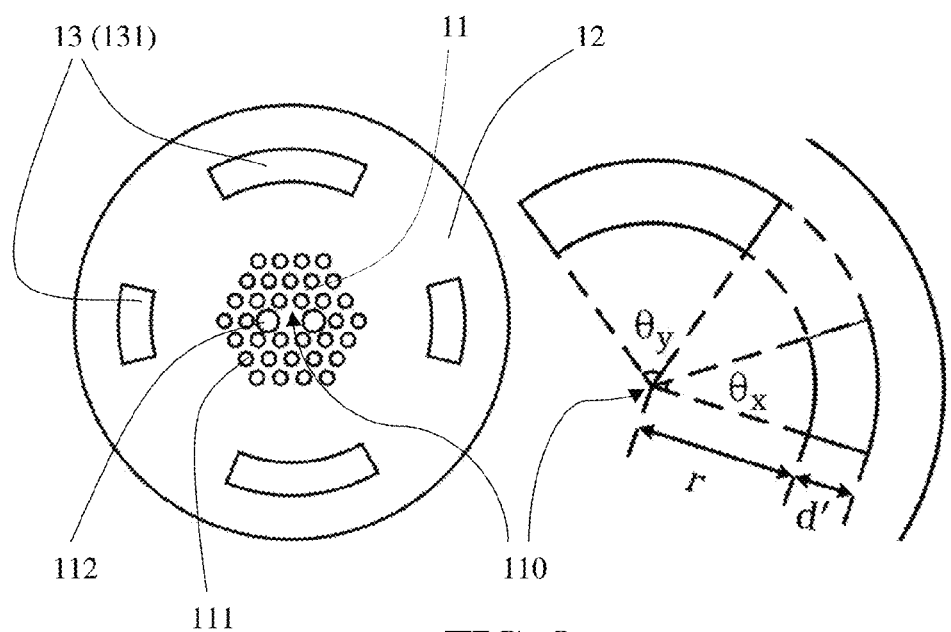
FIG. 8 shows the parameters of the buffer structures in the PCF shown in FIG. 3.

FIG. 8 shows the parameters for the buffer structures 13 of the PCF 1 in FIG. 3. Table 1 shows the optimal values of the parameters obtained from simulation studies.

| | |
|---|---|
| r | 30.63 μm |
| d' | 8.37 μm |
| $θ_x$ | 30° |
| $θ_y$ | 40° |

Figure 9:
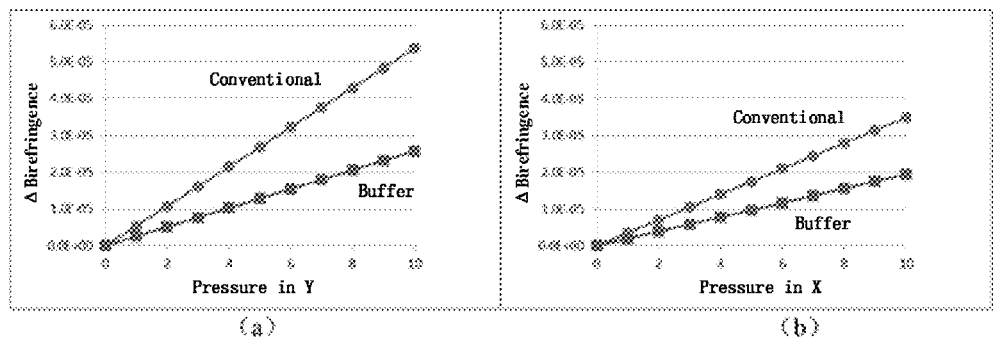
FIG. 9 shows the birefringence variation with pressure in the direction of (a) X-axis and (b) Y-axis, respectively.
Figure 10:
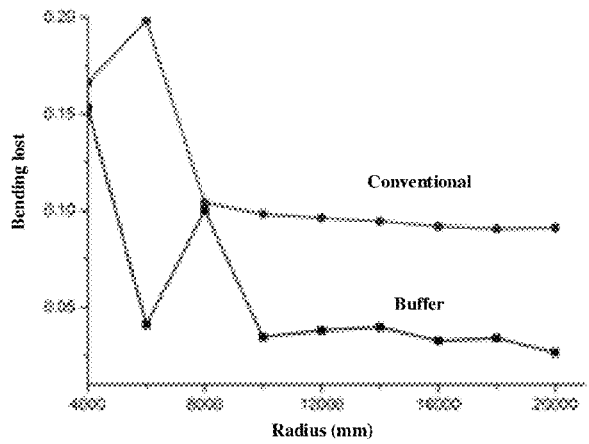
FIG. 10 shows the fiber's bending loss at various bending radii for the PCF of the present invention shown in FIG. 3.

FIG. 9 and FIG. 10 show the birefringence variation and bending loss of the new design PCF of the present invention and conventional PCF. In FIG. 9, (a) shows that the birefringence variation with the pressure in Y-axis direction is lower in the buffered PCF by 50~60% compared with the conventional fiber, while (b) shows that the birefringence variation with the pressure in X-axis direction is also significantly reduce. FIG. 10 shows that the bending loss of the two kinds of PCF, and the one with buffer according to the present invention obviously has less bending loss compared with the conventional fiber.

What is claimed is:

1. A low magnetic sensitivity polarization-maintaining photonic crystal fiber (PM-PCF) based on mechanical buffer, comprising a photonic crystal fiber with a core region and a cladding layer enclosing the core region, wherein:
the core region comprises at least 3 layers of air-holes and two enlarged air-holes of a dimension greater than that of each of the other air-holes;
a plurality of buffer structures are formed in the cladding layer and positioned symmetrically with respect to an X-axis and/or a Y-axis of a Cartesian coordinate system having an origin at a center of the core region, wherein the two enlarged air-holes are positioned along the X-axis; and
each of the plurality of buffer structures is formed by replacing silica of any shape by air, and wherein:
the plurality of buffer structures include four buffer structures each having an annulus sector shape which is a sector of a same annulus with a center located at the center of the core region; two of the four buffer structures are located along the X-axis and symmetrically positioned with respect to the Y-axis; and the other two of the four buffer structures are located along the Y-axis and symmetrically positioned with respect to the X-axis.

2. The low magnetic sensitivity PM-PCF based on mechanical buffer of claim 1, wherein the core region has 3 layers of air-holes.

3. The low magnetic sensitivity PM-PCF based on mechanical buffer of claim 1, wherein no solid materials are filled in the plurality of buffer structures during fabrication thereof.

4. The low magnetic sensitivity PM-PCF based on mechanical buffer of claim 1, wherein the annulus of which each of the four buffer structures is a sector has a width d'=8.37 μm and an inner radius r=30.63 μm; each of the two buffer structures located along the X-axis is bordered by two straight lines forming an angle $θ_x$=30° at the center of the core region; and each of the two buffer structures located along the Y-axis is bordered by two straight lines forming an angle $θ_y$=40° at the center of the core region.

5. The low magnetic sensitivity PM-PCF based on mechanical buffer of claim 1, wherein the plurality of buffer structures further include at least two air-holes positioned symmetrically with respect to the Y-axis.

6. The low magnetic sensitivity PM-PCF based on mechanical buffer of claim 1, wherein the plurality of buffer structures further include a plurality of air-holes formed immediately outside the core region, and more of the air-holes are formed along the Y-axis than are formed along the X-axis.

\* \* \* \* \*